Dec. 24, 1963    H. E. WRIGHT    3,115,239
VIBRATORY PARTS FEEDER
Filed Feb. 19, 1962

INVENTOR.
Howard E. Wright
BY
S. C. Thorpe
ATTORNEY

United States Patent Office 3,115,239
Patented Dec. 24, 1963

3,115,239
VIBRATORY PARTS FEEDER
Howard E. Wright, Kokomo, Ind., assignor to General Motors Corporation, Detroit, Mich., a corporation of Delaware
Filed Feb. 19, 1962, Ser. No. 174,068
1 Claim. (Cl. 198—220)

This invention relates to automatic feeder devices for small parts such as nuts, bolts, etc., and particularly to those of the so-called "vibratory hopper" type comprising a container with an inclined ramp therein along which the parts advance out of the container in response to vibratory induced movement.

Because the quantity of parts within the hopper varies considerably between refillings thereof, and the stroke of the vibratory movement induced by the usual electro-magnet and return springs varies with the resulting change in the total weight or mass being vibrated, an undesirable fluctuation in rate of feed of the parts is obtained from such devices as heretofore used. Such fluctuation is particularly objectionable where other equipment required to be supplied with the fed parts at a uniform rate is associated with such a hopper in an assembling or other processing operation. While means can be devised to vary the power or frequency input to the electro-magnet so as to more or less accommodate the effect of this change in mass on the hopper delivery rate, such devices tend to be expensive and to get out of order.

It is the object of my invention to obtain a substantially constant output feed rate in a simple and relatively inexpensive manner, and which is entirely automatic in operation, yet is free from any tendency to malfunction. In its broadest aspects, my invention amounts to applying damping means to the vibrating hopper which yieldingly opposes its vibratory movement with a force which increases with increased speed of such movement. Accordingly, as the stroke tends to increase with the decreasing inertia of the vibrated member, the damping means automatically compensates for the effect of the decreasing inertia to substantially minimize the change in stroke which would otherwise occur. In its application to a vibratory hopper, the rate of feed of the parts is thereby stabilized.

For a clear understanding of the means for carrying out my invention as applied to a vibratory parts feeder, reference is made to the following detailed description and drawing, in the latter of which:

Figure 1:
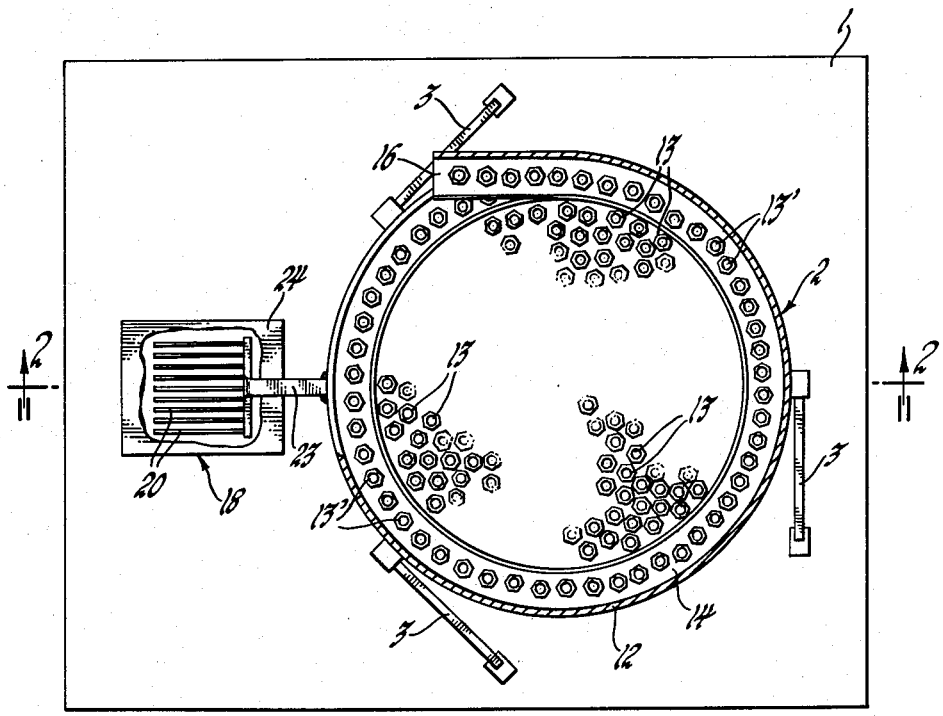
FIGURE 1 is a plan view of a conventional vibratory hopper with a hydraulic fluid damping means operatively associated therewith in accordance with my invention.

Referring now in detail to the various parts, a fixed support 1 has a container 2 of a vibratory hopper suspended thereabove by three leaf springs 3. These springs are arranged equi-distant about the periphery of the container 2 and extend generally tangentially and downward therefrom at an angle to the support 1, each being connected at its upper and lower ends to the container and support. This arrangement of the springs results in effecting axial rotation of the container 2 coincident with its movement to or from the support 1.

Mounted on the support below the container 2 is an electro-magnet 4 having a core 5 on which is wound a coil 6 connected by suitable leads 7 and 8 to a source of alternating current, such as 110 volts A.C. To convert the alternating supply current to a pulsating or intermittent direct current, there is provided a half wave rectifier which is schematically indicated at 9. A suitable switch 10 may also be provided in one of the current leads for starting and stopping the operation of the electro-magnet. The armature for the electro-magnet is shown as the bottom wall 11 of the container 2, which for this purpose is made of suitable magnetic material. The side walls 12 of the container extend upwardly from its bottom wall to a sufficient height to provide ample capacity of the container for holding a relatively large collection of loose parts 13 to be fed to an associated receiver (not shown). Within the container 2 and extending helically thereof adjacent the side walls 12 is a continuous inclined ramp or track 14, the lower end 15 of which emerges from the bottom wall 11 of the container, and the upper end 16 terminates adjacent the upper open end of the container.

With the switch 10 closed, the pulsating current supplied to the electro-magnet causes it to draw the container 2 downwardly in opposition to the springs 3, which during such downward movement impart rotary movement also to the container as pointed out above. Upon cessation of the current impulse, the springs 3 return the container to its initial position with reverse upward and rotary motion. A difference in speed of the respective upward and downward strokes results in those parts 13' which come in contact with the ramp 14 progressively advancing therealong in an upward direction.

The structure thus far described is conventional and forms no part per se of my invention.

Figure 2:
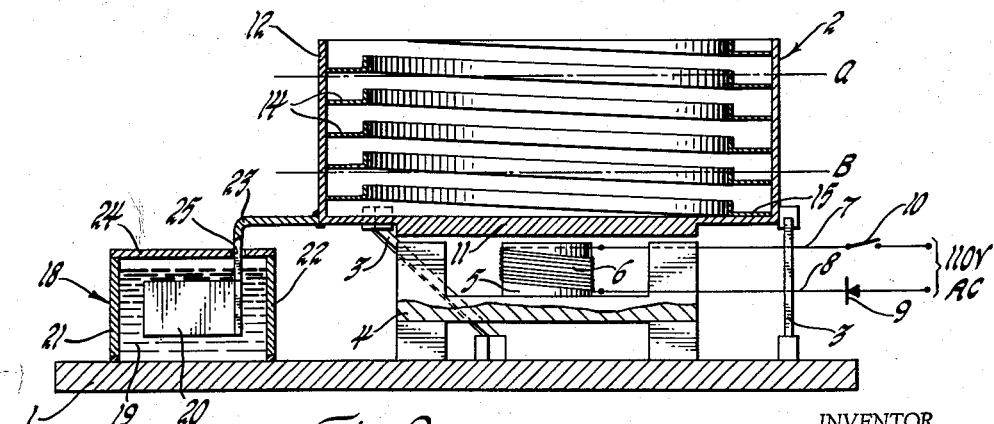
FIGURE 2 is a transverse sectional view of the mechanical parts shown in FIGURE 1, taken substantially along the line 2—2 thereof, and schematically illustrating the electric input to the electro-magnet for vibrating the hopper.

In use, such a vibratory hopper is periodically charged with a quantity of parts 13 sufficient to fill it to a substantially high level, such as represented by the line A in FIGURE 2. Thereafter, as the parts feed out of the container along the ramp 14 under the influence of the vibratory movement, the level of loose parts therein decreases to a height such as indicated by the line B in FIGURE 2. This change in quantity of parts contained in the container during its vibration has a direct effect on the over-all weight being vibrated, and hence on the speed with which the springs 3 can operate to return the container and its load of parts after each power stroke of the electro-magnet 4. As the result, the feed rate of the parts 13' traveling up the ramp 14 increases as the quantity of parts in the container drops from the level A to the level B.

To prevent or minimize such a change in feed rate, I provide damper means indicated generally by the reference numeral 18, which I have illustrated in the form of a hydraulic fluid body 19 having one or more elements of extended surface area 20 immersed therein. It will be noted that these immersed surfaces extend radially of the container so as to be disposed generally normal to its path of vibratory movement. As shown, side walls 21 and 22 containing this body of fluid are fixed to the support 1, and the immersed members 20 are rigidly connected by a suitable bracket 23 to the container 2. A cover 24 is shown enclosing the upper end of the fluid body, with an opening 25 therein through which the bracket 23 extends, it being understood that the bracket 23 and the members 20 have ample clearance for movement with the container relative to the cover 24 and the walls containing the body of fluid 19.

The viscosity of the fluid 19 and the total surface area of the members 20 will of course depend upon the amount of damping required to stabilize the parts feed rate to the extent desired in relation to the relative weights of the parts 13 and the container 2, and the power capacity of the electro-magnet and the stiffness of the springs 3. As illustrative of one specific example in the application of my invention to a container weighing 10 lbs. when empty and 22 lbs. when substantially filled with parts, I have found that when vibrating it at a frequency of 30 cycles per second I obtained the same feed rate of 30 parts per minute with the container "empty" as when "full." In this example, I used water as the fluid 19, and paddle elements 20 having a total immersed area of 170 square inches. By comparison, without the damper means 18, the parts feed rate rose to 120 parts per minute as the container approached the "empty" condition.

While I have illustrated only the hydraulic type of damper 18, it will be appreciated that equivalent damper devices such as those of the eddy-current, pneumatic etc. would serve the same purpose in yieldingly opposing the speed of vibratory movement with a force increasing with increased speed of movement of the container.

I claim:

In combination, a vibratory hopper comprising a container with an upwardly inclined track therein operative when the container is vibrated to slidably feed articles out of the container from a loose collection of said articles within the container, means including resilient means for vibrating said container, and damper means yieldingly opposing vibratory movement of the container with a force increasing with increased speed of said movement, whereby the effect of variation in the total weight of the container and of said loose collection on the speed of movement of the container is substantially minimized and the rate of said feed is accordingly stabilized, said damper means comprising a body of fluid, walls defining said body and a member movable relative to said walls having an extended surface area immersed in said fluid and disposed generally normal to the path of vibratory movement of said container, said walls being fixed to one of said support and container, and said member being fixed to the other thereof.

References Cited in the file of this patent

UNITED STATES PATENTS

| | | |
|---|---|---|
| 2,790,534 | Spurlin | Apr. 30, 1957 |
| 2,847,767 | Carrier | Aug. 19, 1958 |